United States Patent [19]

Cockburn

[11] 4,389,055
[45] Jun. 21, 1983

[54] VELOCIPEDE

[76] Inventor: Paul A. Cockburn, 1 Caledonia St., Paddington, New South Wales 2021, Australia

[21] Appl. No.: 205,050

[22] Filed: Nov. 7, 1980

[30] Foreign Application Priority Data

Nov. 15, 1979 [AU] Australia .............................. PE1340

[51] Int. Cl.³ ............................................ B62K 19/08
[52] U.S. Cl. ................................... 280/274; 280/259; 280/281 B
[58] Field of Search ........... 280/259, 270, 274, 281 B, 280/281 R

[56] References Cited

U.S. PATENT DOCUMENTS

| | | | |
|---|---|---|---|
| 185,401 | 12/1876 | Marble | 280/274 |
| 385,258 | 6/1888 | Evans | 280/259 |
| 1,476,732 | 12/1923 | Smith | 280/274 |
| 1,772,231 | 8/1930 | Smith | 280/274 |
| 2,244,709 | 6/1941 | Kinzel | 280/281 |
| 3,377,084 | 4/1968 | Musichuk | 280/274 |

Primary Examiner—Joseph F. Peters, Jr.
Assistant Examiner—Donn McGiehan

[57] ABSTRACT

A velocipede which may be constructed either as a bicycle or a tricycle by attaching the appropriate rear frame to a central unitary frame located in the area of the headstock. As a bicycle front forks protrude downwardly from the headstock and support a front wheel driven by pedal cranks, and rear forks are cantilevered downwardly and rearwardly from the central unitary frame. As a tricycle the rear forks are replaced by a frame supporting two side by side rear wheels. Handle bars protrude upwardly from the headstock and an elongate inclined seat protrudes rearwardly and upwardly from the headstock.

The velocipede is simple, compact and may be ridden by riders of different sizes without adjustment.

5 Claims, 4 Drawing Figures

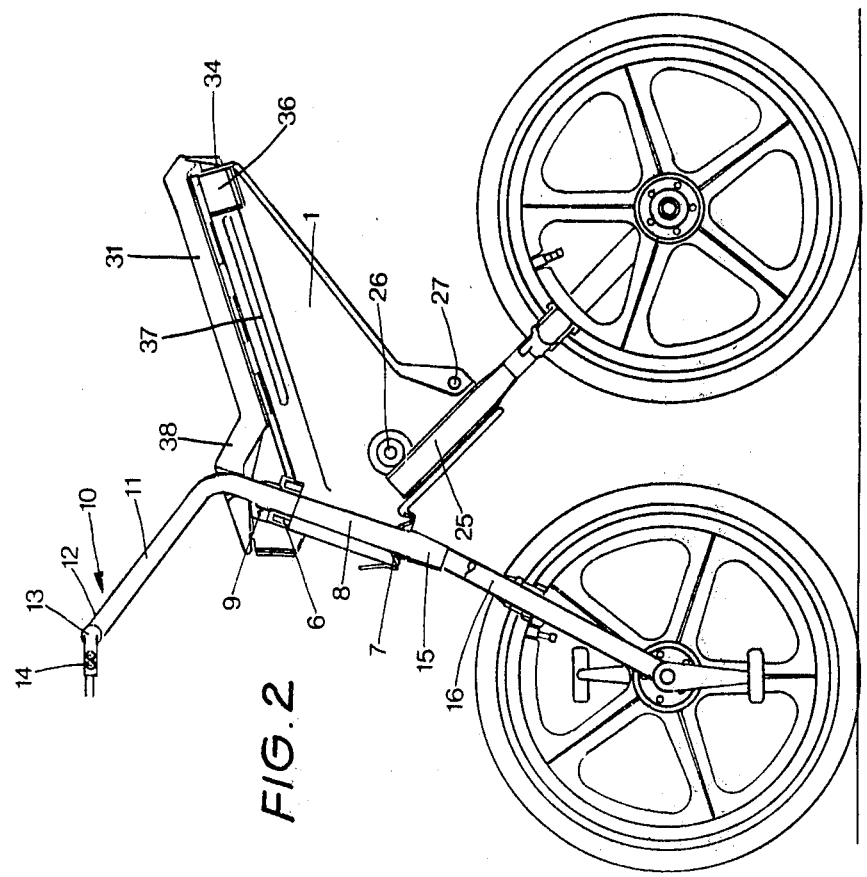

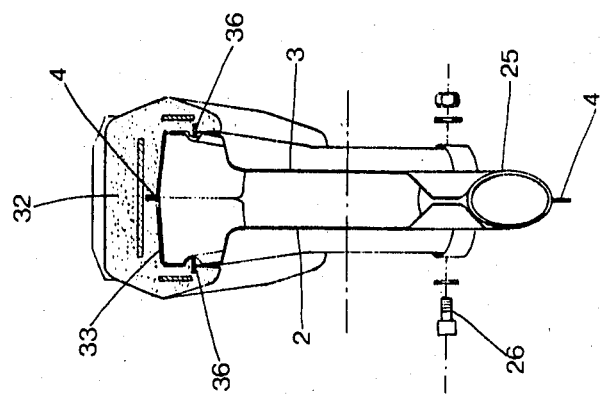
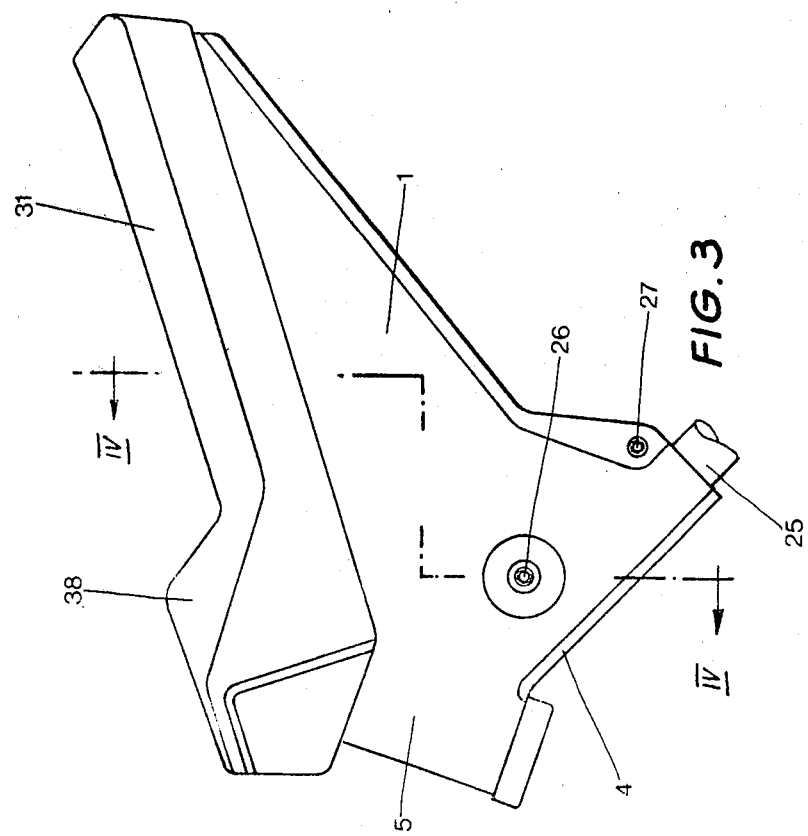
FIG. 4
FIG. 3

VELOCIPEDE

This invention relates to a velocipede and has been devised particularly though not solely as a bicycle which may alternatively be constructed as, or converted to, a tricycle by the substitution of simple components.

In the past bicycles have been construction from a large number of complex components normally by welding a frame from steel tube and attaching components such as drive chains and sprockets, wheels, handle bars and seats to the frame. This construction results in a bicycle which is expensive to manufacture due to the large number of components required and the many processes in manufacturing and assembling the components to a finished bicycle. The end product, because of its complex nature and the complexity of the components, often has a limited durability and a short lift when used in less than ideal maintenance conditions.

It is a further disadvantage of existing bicycles that different frame sizes are needed for different sizes of rider and that for any given frame size, the components such as handle bars and seats, must be adjusted to suit riders of different sizes. This adjustment is time consuming and annoying and restricts the use of a bicycle in a situation where it is desired that the bicycle be ridden at different times by people of considerably different physical measurements.

It is therefore an object of the present invention to provide a velocipede which will obviate or minimise the foregoing disadvantages in a simple yet effective manner or which will at least provide the public with a useful choice.

Accordingly the invention consists in a velocipede comprising a spindle rotatably mounted in a headstock, handle bars attached to the upper end of said spindle, front forks attached to the lower end of said spindle, a front wheel rotatably supported between said front forks, a set of pedal cranks operable on said front wheel, a seat protruding rearwardly from said headstock, a rear frame protruding downwardly and rearwardly from said headstock and at least one rear wheel rotatably mounted on said rear frame.

Notwithstanding any other forms that may fall within its scope, one preferred form of the invention and variations thereof will now be described with reference to the accompanying drawings, in which:

FIG. 2 is a view similar to FIG. 1 showing the central frame, seat and rear forks cut away;

FIG. 3 is a side view to an enlarged scale of the central unitary frame and seat of the bicycle shown in FIG. 1; and FIG. 4 is a cross-sectional elevation on the line IV—IV of FIG. 3.

Figure 1:
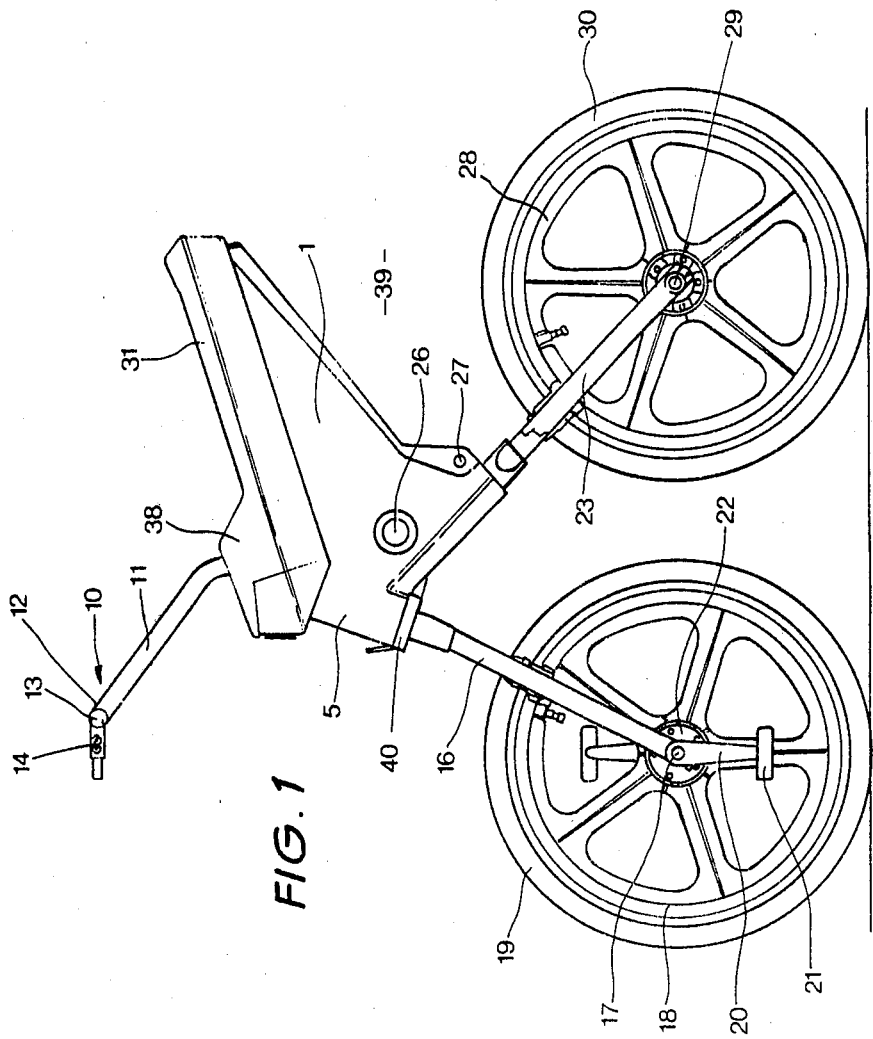
FIG. 1 is a side view of a bicycle form of velocipede according to the invention.

In the preferred form of the invention, a velocipede described with primary reference to a bicycle configuration and with further reference to a tricycle alternative, is constructed as follows A central unitary frame 1 is provided which may be manufactured by any known technique such as by casting or by fabrication but which is preferably manufactured by pressing left hand and right hand halves 2 and 3 respectively (FIG. 4) of the frame from sheet metal so that each half has a peripheral flange 4. The peripheral flanges are then fastened together, for example by welding, to form the central unitary frame 1 having a hollow interior. In an alternative form of the invention, the central unitary frame could be constructed in other ways and from other material, for example by moulding or casting from a suitable plastics material.

The central unitary frame has a forward portion forming a headstock 5 in which are supported bearings 6 and 7 arranged to rotatably support a spindle 8. The bearing 6 may, for example, be a plain bearing to damp the steering due to inherent friction and the bearing 7 may be a cone bearing arranged to support the weight of the bicycle. The spindle may be located in the bearings by a clamp 9 located immediately above the plain bearing 6.

The bicycle is provided with handle bars 10 in the form of a tube 11 fastened to and extending upwardly from the spindle 8 and then curved forwardly to terminate in an upper end 12 to which is fastened a transverse member 13 to form T-shaped handle bars. The handle bars may be provided with a hand brake actuator 14 to actuate cable operated brakes on the bicycle.

The spindle 8 engages the externally knurled lower end of the tube 11. The lower cone bearing 7 is pressed onto the spindle 8 which is flared outwardly at its lower end 15. A cap 40 is provided which engages with the cone bearing and also assists in holding the two halves of the frame 1 together. The bearing self-aligns and tightens when weight is placed on the bicycle. The clamp 9, which prevents the handle bars from dropping when the bicycle is lifted by the frame or seat, can be adjusted to take up slack in the system or to lower the cone bearing for lubrication.

The lower end 15 of the spindle is flared outwardly and tubes 16 are welded to either side of the outwardly flared portion to form the front forks of the bicycle. The front forks are provided with an axle 17 supporting the front wheel 18 which may, for example be a conventional spoked bicycle wheel having a pneumatic tire. In the preferred form of the invention, however, the wheels are formed from a nylon reinforced plastics material, provided with a pneumatic tire 19 in the conventional manner.

The front wheel is provided with pedal cranks 20 and pedals 21 which may be rigidly secured to the axle 17 or alternatively may be arranged to drive the front wheel through a ratchet mechanism providing a free wheeling effect for ease of riding the bicycle. The direct drive so provided is suitable for some low speed industrial or "off-road" situations, but for other uses the bicycle is provided with an integral overdrive planetary gearbox incorporated within the hub 22 of the front wheel.

The bicycle is provided with rear forks 23 comprising two tubes welded either side of a central tube 25 which is housed within the lower part of the central unitary frame 1. The tube 25 is held in place by friction achieved by tightening pinch bolts 26 and 27 to tighten the sides 2 and 3 of the central unitary frame about the tube 25 and hold it firmly in place. In the preferred form of the invention as shown in the accompanying drawings, the rear forks are cantilevered downwardly and rearwardly from the headstock area 5 in a substantially straight line intersecting with the spindle 8 of the headstock.

A rear wheel 28 is provided mounted in suitable bearings on an axle 29 supported in the rear forks 23 and is provided with a pneumatic tire 30 in a similar manner to the front wheel.

The bicycle is kept to a very compact overall dimension by using wheel sizes which are smaller than those commonly used on bicycles. In the preferred form of the invention, the wheels are approximately 500 mm (20") in diameter. Larger wheels could, of course, be used but it is not envisaged that a bicycle of this configuration would have wheels larger than 600 mm (24") in diameter. The wheel base of the bicycle is able to be kept very short due to the configuration of the bicycle and it is not envisaged that the wheel base would exceed 900 mm (36"). In the preferred form of the invention as shown in the drawings, the wheel base of the bicycle is less than 750 mm (30") and preferably of the order of 625 to 700 mm.

The bicycle is provided with an elongate seat 31 mounted on top of the unitary frame 1 and cantilevered rearwardly and upwardly from the headstock 5. The seat may be formed of any suitable material but is preferably moulded from a self-skinning plastics foam forming a compressible outer layer 32 about a plastics inner shell 33. The plastics inner shell is provided with a hinged end at the rear 34 to provide access to a tool box compartment 36. The seat is mounted on the unitary frame as a force fit so that inwardly protruding flanges 36 in either side of the seat engage with corresponding inwardly formed ribs 37 in the central frame to hold the seat firmly in place. The forward portion 38 of the seat is raised upwardly and continued forwards around the handle bar rod 11 to provide protection for the rider in the event of a collision. The seat is inclined to the horizontal at an angle of between 5° and 25° and preferably at an angle of approximately 15°. Because of the elongate and angled nature of the seat, it is possible for riders of different sizes to use the bicycle without making any adjustments to the frame and yet to be placed in the ideal ergonomic position for operation of the pedals and handle bars. To this end a shorter rider sits on the forward end of the seat 31 and is correctly ergonomically placed in relationship to the pedals and handle bars, and a taller rider sits towards the rearward end of the seat 31 where he is placed further from the pedals and handle bars and raised to a seating position higher above the ground and is again in the correct ergonomic position for operating the bicycle.

The rider is lower to the ground then on a conventional bicycle which assists in maintaining balance and steadying the bicycle when at rest. The seat 31 may be made sufficiently long to support a pillion rider on the rear end of the seat.

Because the seat is cantilevered rearwardly from the headstock 5 a clear open space 39 is left above the rear wheel and behind and below the seat 31. This space may be utilised by mounting a load carrying tray or luggage rack above the rear wheel. Because the container is located directly over the rear wheel and fairly low to the ground due to the small diameter of the wheel, a large load may be carried without upsetting the balance of the bicycle or making the bicycle difficult to ride. It is a further feature of the bicycle that when ridden, the thighs of the rider extend forwardly from the seat 31 and do not cross the open space 39. This allows the luggage rack or container to be much wider than the bicycle without fouling the legs of the rider and so permits a larger load to be carried.

Because of the compact dimensions of the bicycle and the nature of the components used, all of the components may be fitted inside a small container and in fact, all the components of the preferred form of the bicycle shown in the drawings will fit inside a circle of 600 mm diameter. This design feature has the considerable advantage that the bicycle components may be packaged into a circular container 600 mm in diameter and of a suitable minimal depth. A robust container of this nature may be quickly and cheaply formed from a short length of 600 mm diameter heavy cardboard tube provided with pressed sheet metal lids at each end. The entire components of a disassembled bicycle may be packaged in this container after manufacture so that a large number of bicycles packaged in this way may be simply and cheaply transported in a very compact state to the point of sale or use. Because the bicycle is simple to assemble from the components, the bicycle may be sold in the container to the intended user or alternatively may be assembled and sold in the fully assembled configuration as shown in FIG. 1.

Although the preferred form of the velocipede has been described as a bicycle, it will be apparent that the rear forks and rear wheel assembly may be quickly and conveniently removed from the central unitary frame by loosening the pinch bolts 26 and 27. The rear assembly may be replaced by a rear frame supporting two rear wheels side by side and resulting in a tricycle configuration. The rear frame may be a simple T-shaped frame having a central stalk tube fitted into the central unitary frame in place of the tube 25 and terminating in a horizontal head tube axle having the two rear wheels located at either end. Alternatively the rear frame may comprise a tube insertable into the unitary frame as before but of shortned length and terminating in a T-head tube extending across the end of the central tube and then being turned downwardly and rearwardly at each end to form locating points for individual axles for each rear wheel. This configuration has the advantage that there is no continuous axles between the two rear wheels and enables a large load carrying container to be mounted between the rear wheels for carrying a load of considerable size and weight. It is envisaged that the tricycle configuration has many applications both in industrial situations where it can be used for the simple transportation of goods or components from place to place within an industrial complex, and also in underdeveloped countries as a viable alternative form of man-powered transportation for transporting people and goods.

Both the bicycle and tricycle configuration are particularly suitable for use in underdeveloped countries as all the components are particularly simple and robust requiring little maintenance and having an expected long life. The construction is also very economical compared with conventional bicycles as the components are all simple and easy to manufacture, and the amount of material used is kept to a minimum due to the compact size and configuration of the bicycle.

What I claim is:

1. A velocipede including:
   a longitudinally elongated central unitary frame having a forward portion providing a headstock and a rear portion extending rearwardly from said forward portion;
   one or more bearings arranged in the headstock;
   a spindle rotatably mounted on the headstock so as to be rotatably supported by said bearings for rotation about a generally vertical axis;
   handle bars attached to the upper end of said spindle, front forks attached to the lower end of said spindle, a front wheel rotatably supported between said front forks and a set of pedal cranks operable on said front wheel;

a fixed non-adjustable elongated seat directly supported on said rear portion so as to extend therealong and provide a seating surface extending upwardly and rearwardly from said headstock;

a rear frame supported by said central frame and extending downwardly and rearwardly from said headstock; and at least one rear wheel rotatably mounted on said rear frame.

2. A velocipede as claimed in claim 1 wherein said seating surface is inclined at an angle of between 5° and 25° to the horizontal.

3. A velocipede as claimed in claim 2 wherein said seat is cantilevered rearwardly from said headstock so as to leave a clear open space beneath said seat and above said rear wheel.

4. A velocipede as claimed in claim 1, 2 or 3 when made in the configuration of a bicycle and wherein said rear frame comprises rear forks protruding downwardly and rearwardly from said headstock having one rear wheel rotatably mounted in said forks.

5. A velocipede as claimed in claim 4 wherein said rear forks are cantilevered downwardly and rearwardly from said headstock in a substantially straight line intersecting with said spindle of said headstock.

* * * * *